United States Patent
Bergkvist et al.

(10) Patent No.: US 12,294,418 B2
(45) Date of Patent: May 6, 2025

(54) WIRELESS DEVICE AND RELATED METHOD FOR CONTROLLING A POSITIONING SENSOR

(71) Applicant: Sony Group Corporation, Tokyo (JP)

(72) Inventors: Hannes Bergkvist, Basingstoke (GB); Peter Exner, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 443 days.

(21) Appl. No.: 17/732,256

(22) Filed: Apr. 28, 2022

(65) Prior Publication Data

US 2022/0376800 A1  Nov. 24, 2022

(30) Foreign Application Priority Data

May 18, 2021 (SE) .................................. 2150632-4

(51) Int. Cl.
*H04B 17/27* (2015.01)
*H04B 17/309* (2015.01)
(Continued)

(52) U.S. Cl.
CPC .......... *H04B 17/309* (2015.01); *H04B 17/27* (2015.01); *H04B 17/382* (2015.01); *H04W 56/0045* (2013.01)

(58) Field of Classification Search
CPC .... H04B 17/309; H04B 17/27; H04B 17/382; H04W 56/0045; Y02D 30/70; G08C 17/02
See application file for complete search history.

(56) References Cited

U.S. PATENT DOCUMENTS

2013/0260843 A1* 10/2013 Hu ........................ H04M 1/22
  455/574
2013/0324196 A1* 12/2013 Wang ..................... G06F 1/00
  455/574

(Continued)

FOREIGN PATENT DOCUMENTS

JP   2011120151 A    6/2011
KR  102240631 B1    4/2021
(Continued)

OTHER PUBLICATIONS

Office Action and Search Report from corresponding Swedish Application No. 2150632-4, mailed on Jan. 19, 2022, 8 pages.
(Continued)

*Primary Examiner* — Edan Orgad
*Assistant Examiner* — Malick A Sohrab
(74) *Attorney, Agent, or Firm* — Tucker Ellis LLP

(57) ABSTRACT

A wireless device includes a positioning sensor, memory circuitry, a wireless interface, and processor circuitry. The processor circuitry is configured to obtain a channel quality parameter indicative of a channel quality of a wireless communication channel. The processor circuitry is configured to determine whether the channel quality parameter satisfies a first criterion. The processor circuitry is configured to, when the channel quality parameter satisfies the first criterion, determine, by using an activation model, a control parameter based on the channel quality parameter. The processor circuitry is configured to, when the channel quality parameter satisfies the first criterion, control the positioning sensor based on the control parameter.

15 Claims, 4 Drawing Sheets

(51) Int. Cl.
*H04B 17/382* (2015.01)
*H04W 56/00* (2009.01)

(56) References Cited

U.S. PATENT DOCUMENTS

| | | | |
|---|---|---|---|
| 2016/0165569 A1* | 6/2016 | Rajala | H04B 1/385 |
| | | | 455/456.2 |
| 2016/0174099 A1* | 6/2016 | Goldfain | H04W 56/0005 |
| | | | 375/130 |
| 2017/0013562 A1* | 1/2017 | Lim | H04M 1/725 |
| 2017/0195104 A1* | 7/2017 | Lindoff | H04L 5/0057 |
| 2018/0059250 A1* | 3/2018 | Nakata | G01S 19/46 |
| 2020/0153904 A1 | 5/2020 | Yoo | |

FOREIGN PATENT DOCUMENTS

| | | | |
|---|---|---|---|
| WO | 2017080604 A1 | 5/2017 | |
| WO | 2019228630 A1 | 12/2019 | |

OTHER PUBLICATIONS

The Extended European Search Report from corresponding European Application No. 22163618.6; mailed on Sep. 9, 2022; 7 pages.

* cited by examiner

WIRELESS DEVICE AND RELATED METHOD FOR CONTROLLING A POSITIONING SENSOR

RELATED APPLICATION DATA

This application claims the benefit of Swedish Patent Application No. 2150632-4, filed May 18, 2021, the disclosure of which is incorporated herein by reference in its entirety.

TECHNICAL FIELD

The present disclosure pertains to the field of wireless devices and positioning sensors. The present disclosure relates to a wireless device and a method for controlling a positioning sensor.

BACKGROUND

Today, many wireless devices comprise positioning sensors. However, positioning sensors are known to be very power consuming. Sensor activation is the task of automatically turning on and off sensors in a device in order to save power, and/or optimize performance, or for other reasons. For example, in Internet-of-Things, IoT, devices with battery constraints, sensors, such as global navigation satellite system, GNSS, and WiFi sensors, are major power consumers and the operational time on a battery charge may be affected by the activation of these sensors.

SUMMARY

Several activation schemes may be possible. One approach is to base the sensor activation on context, for example indoor/outdoor, running/walking etc. Other approaches have used supervision with hand-labelled pre-defined contexts, such as indoor/outdoor and semi-indoor/outdoor, to activate and deactivate sensors. However, these contexts are difficult to define.

Accordingly, there is a need for wireless devices and methods, performed by a wireless device, for controlling a positioning sensor of the wireless device, which can mitigate, alleviate or address the shortcomings existing and can provide an improved controlling of positioning sensors of wireless devices (such as improved sensor activation in wireless devices), with improved activation and/or deactivation, improved accuracy, improved power consumption, and improved adaptability.

A wireless device is provided, the wireless device comprises a positioning sensor, memory circuitry, a wireless interface, and processor circuitry. The processor circuitry is configured to obtain a channel quality parameter indicative of a channel quality of a wireless communication channel. The processor circuitry is configured to determine whether the channel quality parameter satisfies a first criterion. The processor circuitry is configured to, when the channel quality parameter satisfies the first criterion, determine, by using an activation model, a control parameter based on the channel quality parameter. The processor circuitry is configured to, when the channel quality parameter satisfies the first criterion, control the positioning sensor based on the control parameter.

Further a method, performed by a wireless device, for controlling a positioning sensor of the wireless device, is disclosed. The method comprises obtaining a channel quality parameter indicative of channel quality of a wireless communication channel observed by the wireless device. The method comprises determining whether the channel quality parameter satisfies a first criterion. The method comprises, when the channel quality parameter satisfies the first criterion, determining, by using an activation model, a control parameter based on the channel quality parameter. The method comprises, when the channel quality parameter satisfies the first criterion, controlling the positioning sensor based on the control parameter.

It is an advantage of the present disclosure that it enables to improve the activation and deactivation of a positioning sensor of a wireless device (such as improved sensor activation in wireless devices). Further, an improved accuracy and timing in the activation and deactivation of positioning sensors may be achieved.

It may be appreciated that the present disclosure provides controlling of wireless devices to achieve an improved power consumption. For example, the power efficiency improvements may be achieved by only activating the positioning sensor, when the positioning sensor has access to a GNSS (such as global positioning system, GPS). This for example can avoid triggering, unnecessarily, a positioning signal search which is power consuming. Further, the disclosed wireless device provides an efficient control of the positioning sensor in that the control of the positioning sensor is adapted to the channel quality as observed by the wireless device. It may be appreciated that the adaptation of the control of the positioning sensor can lead to an improved power consumption.

Contexts comprising uncertain transitory states, such as semi-indoor/outdoor, are difficult to define objectively and thus it may be difficult to obtain precise ground truth (for example, a correct representation of the actual context). Further, the use of pre-given thresholds that are location specific does not permit to adapt to new environments (such as different buildings materials that may have an effect on radio signal propagation). It is therefore an advantage of the present disclosure that no explicit definition of context (such as static context and/or pre-determined context, for example indoor, outdoor, semi indoor, and/or semi indoor) needs to be provided. For example, an uncertain context can occur when a wireless device is positioned indoor near a window as the GNSS could be available for the wireless device despite being indoor.

The present disclosure may also avoid performing time-consuming manual labeling of geographical areas with a context. The present disclosure thereby provides an improved adaptability of the control of the positioning sensor (for example, based on the activation model being adaptive) with regard to the environment that the wireless device is in. The present disclosure provides a continuous adaptation of the control of the positioning sensor to new environments (such as by using the presence and/or absence of GNSS signal as a ground truth, for example during training of the activation model). The wireless device and/or the positioning sensor may thereby avoid to constantly search for satellites to know whether they have access to the satellite or not.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
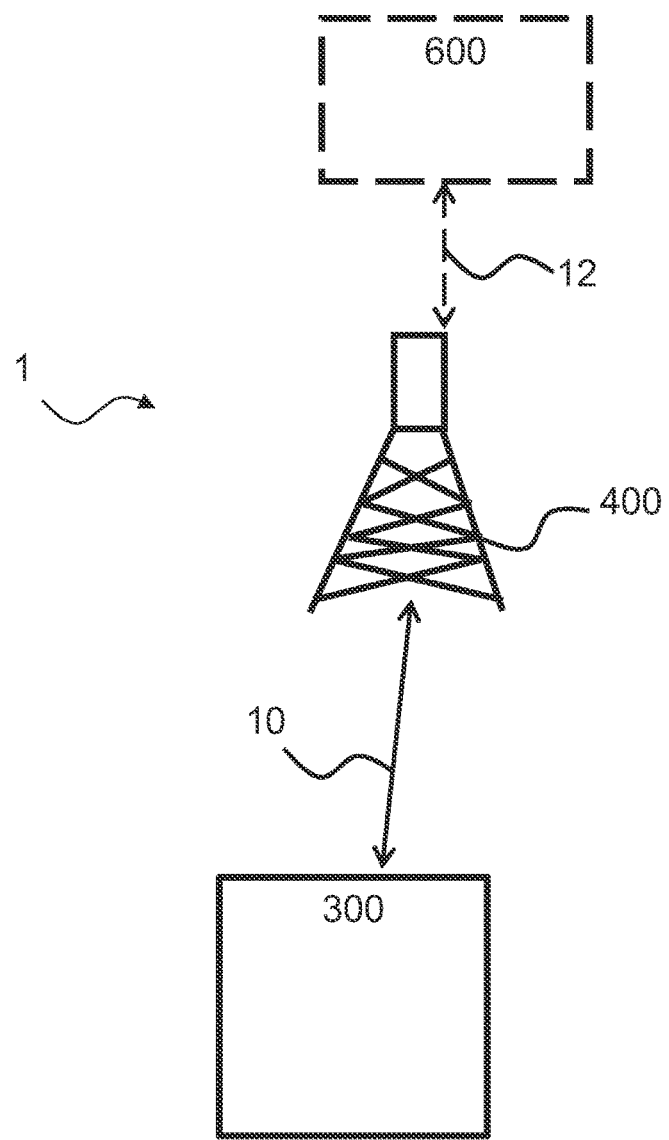
FIG. 1 is a diagram illustrating an example wireless communication system comprising an example network node and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example network node 400, an example wireless device 300 according to this disclosure, and optionally an example server device 600 according to this disclosure.

As discussed in detail herein, the present disclosure relates to a wireless communication system 1 comprising a cellular system, for example, a 3GPP wireless communication system. The wireless communication system 1 comprises a wireless device 300 and/or a network node 400.

A network node disclosed herein refers to a radio access network node operating in the radio access network, such as a base station, an evolved Node B, eNB, gNB in NR. In one or more examples, the RAN node is a functional unit which may be distributed in several physical units.

The wireless communication system 1 described herein may comprise one or more wireless devices 300, and/or one or more network nodes 400, such as one or more of: a base station, an eNB, a gNB and/or an access point.

A wireless device may refer to a mobile device and/or a user equipment, UE (such as a smart phone).

The wireless device 300 may be configured to communicate with the network node 400 via a wireless link (or radio access link) 10.

The server device 600 may be configured to communicate with the network node 400 via a link 12, such as wired and/or wireless link, and/or with the wireless device 300, via the network node 400.

The server device may be seen as a device configured to act as a server in communication with a client device, where the wireless device is configured to act as a client.

The server device 600 may be configured to obtain (such as receive and/or retrieve and/or derive, via a link 12) positioning data and/or a channel quality parameter indicative of a channel quality of a wireless communication channel (such as a wireless communication channel between the wireless device 300 and the network node 400) from the wireless device 300. The server device 600 may be configured to generate activation model data based on the positioning data and/or the channel quality parameter (such as based on an aligning of the positioning data with the channel quality parameter). The server device 600 may comprise memory circuitry, an interface, and processor circuitry (not shown). The server device 600 may be configured to update an activation model according to this disclosure based on the activation model data (such as the server device 600 may be configured to perform the training of the activation model). The server device 600 may be configured to transmit, such as via the network node 400, an updated version of the activation model to the wireless device 300.

Figure 2:
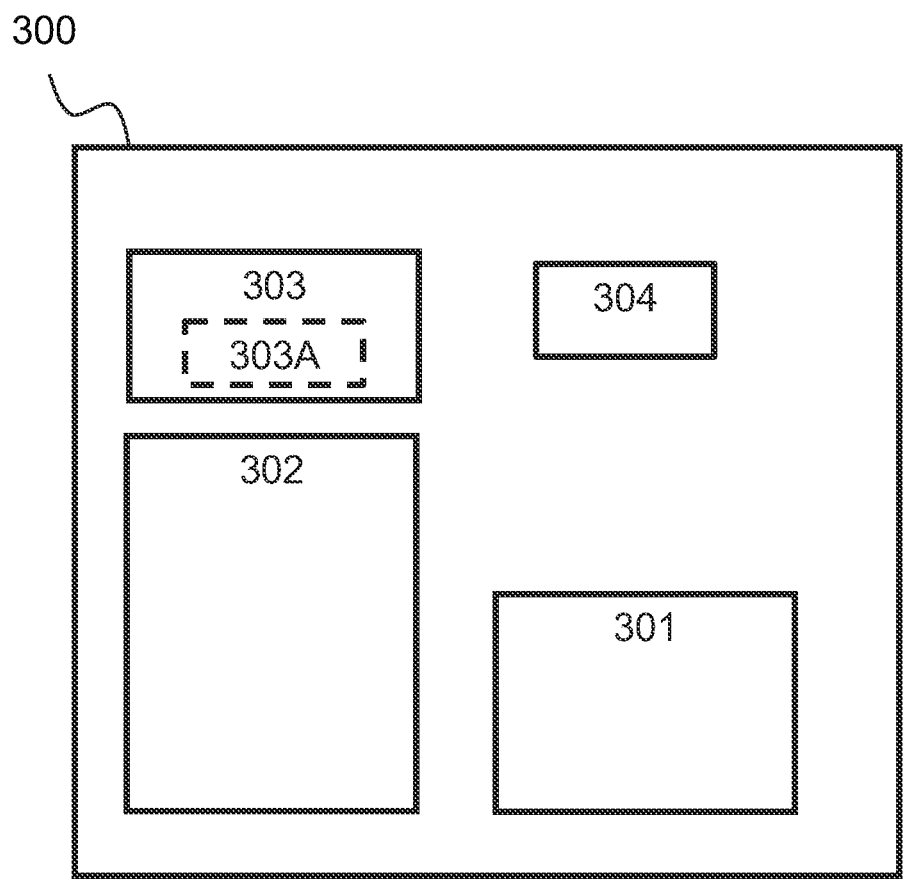
FIG. 2 is a block diagram illustrating an example wireless device according to this disclosure.

FIG. 2. shows a block diagram of an example wireless device 300 according to the disclosure. The wireless device 300 comprises a positioning sensor 304, memory circuitry 301, a wireless interface 302, and processor circuitry 303. The wireless device 300 is configured to perform any of the methods disclosed in FIGS. 3A-3B. In other words, the wireless device 300 may be configured to control the positioning sensor 304.

The wireless device 300 may be configured to communicate with a network node, such as the network node 400 disclosed herein, using a wireless communication system, such as the wireless communication system 1 disclosed herein.

The wireless interface 302 may be configured for wireless communications via a wireless communication system, such as a 3GPP system, such as a 3GPP system supporting one or more of: New Radio, NR, Narrow-band IoT, NB-IoT, Low range, LoRa, and Long Term Evolution—enhanced Machine Type Communication, LTE-M.

The wireless device 300 is configured to obtain, such as via the wireless interface 302 and/or using the processor circuitry 303, a channel quality parameter indicative of a channel quality of a wireless communication channel. The wireless device 300 may be configured to obtain the channel quality parameter from the network node 400 (such as the network node 400 being a serving RAN node). The wireless device 300 may be configured to obtain the channel quality parameter from the network node 400 (such as the network node 400 being a serving RAN node) and/or one or more neighboring network nodes (such as one or more neighboring RAN nodes). In one or more example wireless devices, the wireless device 300 is configured to obtain, such as via the wireless interface 302 and/using the processor circuitry 303, mobile data (such as cellular data, for example LTE data, cellular radio signals), such as from the network node 400. In one or more example wireless devices, the wireless device 300 is configured to determine, such as using the processor circuitry 303, the channel quality parameter based on the mobile data.

In one or more example wireless devices, the channel quality parameter comprises one or more of a signal strength indicator (such as level and/or intensity), a channel quality indicator, CQI, a timing advance value, an error rate parameter, and a difference in signal strength. A signal strength indicator may for example comprise a received signal strength indication, RSSI, and/or channel state information, CSI. An error rate parameter may for example comprise a bit error rate, BER, a frame error rate, FER, and/or a block error rate, BLER. The channel quality parameter may comprise timing data, such as one or more timestamps associated with the channel quality parameter. The channel quality parameter may be indicative of a radio context, such as LTE radio context, of the wireless device 300. The channel quality parameter may be based on or comprise mobile data. The mobile data may be collected periodically for one or more network nodes (such as cell stations, for example all the cell stations that the wireless device has access to) in an area accessible by the wireless device 300. The channel quality parameter may comprise or be based on a change of accessible network nodes and/or a change of signal strength of the wireless device 300 to one or more of the cell stations.

The wireless device 300 is configured to determine, such as using the processor circuitry 303, whether the channel quality parameter satisfies a first criterion. In one or more example wireless devices, the channel quality parameter comprises a number of network nodes accessible by the wireless device. For example, the first criterion may be satisfied by the channel quality parameter, when the number of accessible network nodes has changed. For example, the first criterion may not be satisfied by the channel quality parameter, when the number of accessible network nodes has not changed.

When the channel quality parameter satisfies the first criterion, the wireless device 300 is configured to determine, such as using the processor circuitry 303, by using an activation model, a control parameter based on the channel quality parameter. In other words, the wireless device 300 may be configured to predict, such as using the processor circuitry 303, a control parameter based on the channel quality parameter. Using the activation model may comprise applying the activation model to the channel quality parameter and/or mobile data. The activation model may be seen as a model and/or a scheme configured to provide, based on the channel quality parameter and/or mobile data, the control parameter. The activation model may be seen as a model and/or a scheme configured to provide, based on the channel quality parameter and/or mobile data, an activation indicator and/or a confidence score associated with activation indicator.

In one or more example wireless devices, the processor circuitry 303 comprises inference circuitry 303A configured to operate according to the activation model.

The processor circuitry 303, such as via the inference circuitry 303A, may comprise or be seen as an inference engine configured to perform an inference (such as an inference derivation or an inference result, such as a statistical inference, such as a statistical inference derivation) such as based on the activation model (such as an inference model, for example a machine learning model). The inference circuitry may for example perform or run predictions using the channel quality parameter and/or sensor data from the positioning sensor 304.

When the channel quality parameter satisfies the first criterion, the wireless device 300 is configured to control, such as using the processor circuitry 303, the positioning sensor 304 based on the control parameter. In other words, the wireless device 300 may be configured to control the activation (such as enable, start, switch-on, turn-on, initialize) and/or deactivation (such as deactivate, disable, stop, switch-off, turn-off) of the positioning sensor 304 based on the control parameter (such as GNSS activation based on for example LTE radio contexts). Context may be seen as representative of a situation, scenario, event, condition, factor, and/or scene (such as any combination of the former).

In one or more example wireless devices, the wireless communication channel comprises a cellular communication channel of a cellular system, such as a 3GPP wireless communication system.

In one or more example wireless devices, the wireless device 300 comprises to determine whether the channel quality parameter satisfies the first criterion. In other words, the wireless device 300 may be configured to determine whether the channel quality parameter is above, below, or equal to a signal strength threshold. A signal strength threshold may comprise a pre-configured threshold and/or a threshold estimated from one or more previous channel quality parameters. For example, a signal strength threshold may be calculated by calculating the difference between the two latest channel quality parameters.

In one or more example wireless devices, the first criterion comprises a first threshold. The first criterion may comprise one or more first thresholds, such as including a plurality of thresholds. A first threshold may for example comprise a threshold associated with a channel quality, such as a channel quality threshold. A first threshold may for example comprise a threshold associated with a signal strength, such as a signal strength threshold. A first threshold may for example comprise a threshold associated with channel state information, such as a channel state threshold. A first threshold may for example comprise a threshold associated with an error rate parameter, such as an error rate threshold. For example, when the channel quality parameter comprises the difference in signal strength, the first criterion may be satisfied by the channel quality parameter when the difference in signal strength is above the threshold associated with a signal strength.

In one or more example wireless devices, the processor circuitry 303 is configured to obtain, such as via the wireless interface 302, an updated channel quality parameter.

In other words, the processor circuitry 303 may be configured to assess a channel quality of the wireless communication channel of the wireless device 300 in time, such as reiterating and/or repeating the obtaining of a channel quality parameter.

In one or more example wireless devices, the processor circuitry 303 is configured to repeat the obtaining of the channel quality parameter to obtain an updated channel quality parameter.

In one or more example wireless devices, when the channel quality parameter does not satisfy the first criterion, the processor circuitry 303 is configured to obtain an updated channel quality parameter. In other words, the processor circuitry 303 may be configured to verify whether a channel quality of the wireless communication channel of the wireless device 300 has changed in time, such as reiterating the obtaining of a channel quality parameter and the determining whether the channel quality parameter satisfies the first criterion.

In one or more example wireless devices, the control parameter comprises an activation indicator and/or a confidence score. For example, an activation indicator may be defined as 1 when the activation indicator is indicative of activation or no deactivation (for example if the positioning sensor 304 already is activated) of the positioning sensor 304. An activation indicator may be defined as 0 when the activation indicator is indicative of deactivation or no activation (for example if the positioning sensor 304 already is deactivated) of the positioning sensor 304.

In one or more example wireless devices, the control parameter comprises a single value in the range from 0 to 1 (such as representing an activation indicator and/or a confidence score). For example, the control parameter may comprise a single value of 0.25, 0.5, 0.75, or 0.95. For example, the control parameter may indicate to "activate the positioning sensor" when the value of the control parameter is above a threshold value, such as 0.5. The control parameter may indicate to "deactivate the positioning sensor" when the value is below the threshold value. For example, when the value is 0.75 the control parameter indicator may indicate to "activate the positioning sensor" with a confidence score of 0.75 (such as 75% confidence).

A confidence score may be indicative of a confidence (such as a probability) of the activation indicator. A confidence score may be understood as an inference confidence of the activation model.

In one or more example wireless devices, the control parameter comprises an activation indicator, such as being 0 or 1, and a confidence score indicative of a confidence of the activation indicator. For example, the control parameter may comprise a set of values [X;Y], where X is the activation indicator and Y is the confidence score. The control parameter may for example comprise a set [1;0.75], where 1 is indicative of activation of the positioning sensor 304 and 0.75 is indicative of a confidence or probability of the activation model that the activation indicator being set to activate is correct. The control parameter may for example comprise a set [0;0.95], where 0 is indicative of deactivation of the positioning sensor 304 and 0.95 is indicative of a confidence or probability of the activation model that the activation indicator being set to deactivate is correct.

In one or more example wireless devices, the controlling of the positioning sensor 304 comprises a selection, such as using the processor circuitry 303, of an activation state of the positioning sensor 304. In other words, an activation state of the positioning sensor 304 may be based on the control parameter. An activation state of the positioning sensor 304 may comprise activation or no deactivation (for example if the positioning sensor 304 already is activated) of the positioning sensor 304. An activation state of the positioning sensor 304 may comprise deactivation or no activation (for example if the positioning sensor 304 already is deactivated) of the positioning sensor 304. A selection of an activation state may comprise to set an activation state of the positioning sensor 304, such as set the positioning sensor 304 to be activated or set the positioning sensor 304 to be deactivated.

The processor circuitry 303 described herein may apply artificial intelligence and/or be trained using supervised or unsupervised machine learning, and the machine learning program can employ a neural network. The neural network may be one or more of: a convolutional neural network, a deep learning neural network, and a combined learning module or program. Machine learning may be seen as identifying and/or recognizing patterns in existing data (such as mobile data, input data, and/or channel quality parameter data,) in order to facilitate making predictions for subsequent data, such as control parameter. Models may be created based on example inputs in order to make valid and reliable predictions for novel inputs and/or outputs. Additionally or alternatively, the activation model and related machine learning programs may be trained by inputting sample data sets or certain data into the programs, such as input data, mobile data, and/or numerical analysis thereof. The activation model may utilize deep learning algorithms that may be primarily focused on pattern recognition, and may be trained after processing multiple examples. The activation model and associated program may include Bayesian program learning (BPL).

In supervised machine learning, the processor circuitry 303 described herein may be provided with example inputs and their associated outputs, and may seek to discover a general rule that maps inputs to outputs, so that when subsequent novel inputs are provided the processor circuitry 303 may, based upon the discovered rule, accurately predict the correct output. In unsupervised machine learning, the processor circuitry 303 may be required to find its own structure in unlabeled example inputs. In one or more examples, machine learning techniques may be used to extract data from input data set, such as mobile data set, and/or other data sets. Based on these analyses, the processing circuitry 303 may learn how to identify characteristics and patterns (such as mobile data pattern(s) and/or channel quality pattern(s)) that may then be applied to training the activation model(s), and predicting the control parameter disclosed herein. The present disclosure may use a semi-supervised approach and/or an unsupervised approach, for example by clustering new samples and/or retraining models using inferred ground truth.

In one or more example wireless devices, the activation model may include machine learning. In one or more example wireless devices, the activation model may include artificial intelligence. The machine learning may be a machine learning scheme. The artificial intelligence may be an artificial intelligence scheme.

In one or more example electronic devices, the activation model can comprise a regression model. The activation model can be a neural network regression model. The regression model can be a random forest regression model. The activation model can be configured to perform regression analysis. The activation model can use a set of statistical processes for estimating a relationship between a dependent variable and one or more independent variables. The activation model can be configured to perform a linear regression.

In one or more example electronic devices, the activation model can comprise a classification model. For example, the processor circuitry may comprise a classifier configured to classify the channel quality parameter, such as for determining the control parameter (such as in S108). In other words, the processor circuitry may be configured to determine the control parameter based on a classification of the channel quality parameter (such as a classification of an activation state of the positioning sensor).

In one or more example wireless devices, the activation model comprises model layers including an input layer, one or more intermediate layers, and an output layer for provision of the control parameter. The one or more intermediate layers may be considered as hidden layers (such as hidden features). The one or more intermediate layers may include a first intermediate layer. The activation model may comprise wireless communication channel context representations created as hidden features in the activation model.

In one or more example wireless devices, at least one of the one or more intermediate layers is indicative of a radio context. In other words, the one or more intermediate layers may be seen as context or context data, such as indicative of a radio environment, for example for positioning. Radio context may for example indicate indoor, outdoor, and/or having GNSS access or not. The present disclosure may also avoid performing time-consuming manual labeling of geographical areas with a context. The present disclosure thereby provides an improved adaptability of the control of the positioning sensor (for example, based on the activation model being adaptive) with regard to the environment that the wireless device is in. The present disclosure provides a continuous adaptation of the control of the positioning sensor to new environments (such as by using the presence and/or absence of GNSS signal as ground truth, for example during training of the activation model). The wireless device and/or the positioning sensor may thereby avoid to constantly search for satellites to know whether they have access to the satellite or not.

In one or more example wireless devices, the controlling of the positioning sensor comprises to determine, such as using the processor circuitry, whether the control parameter satisfies a second criterion. In other words, the controlling of the positioning sensor may comprise to determine whether the activation indicator and/or the confidence score satisfy a second criterion.

In one or more example wireless devices, the second criterion is based on a user profile. A user profile may for example comprise a preference of a user of the wireless device 300. For example, a user may have a battery saving user profile where a main goal is to save battery on the wireless device 300 while having access to positioning data when the confidence that the positioning sensor 304 has access to GNSS is high. The second criterion may in this example comprise a second threshold for the control parameter resulting in the positioning sensor 304 being deactivated unless the confidence score of the control parameter is above 0.95 (such as the activation model being 95% confident on its output). The wireless device 300 can in this example control the positioning sensor 304 in such a way that the positioning sensor 304 only uses power (such as by activating and/or using the positioning sensor) when the activation model has a high confidence that the positioning sensor 304 has access to GNSS (such as access to one or more satellites).

In another example, a user may have a positioning performance user profile where a main goal is to have access to positioning data as much as possible (such as the positioning sensor having access to GNSS as much of the time as possible). The second criterion may in this example comprise a second threshold for the control parameter resulting in the positioning sensor 304 being activated unless the confidence score of the control parameter is below 0.5 (such as the activation model being 50% confident on its output). The wireless device 300 can in this example control the positioning sensor 304 in such a way that the positioning sensor 304 tries to get access to GNSS when the confidence score is 0.5 or above (such as by activating the positioning sensor).

In one or more example wireless devices, the controlling of the positioning sensor comprises to set the activation state of the positioning sensor according to the activation indicator when the control parameter satisfies the second criterion. In other words, the activation state may be set to "activate the positioning sensor", such as to follow the activation indicator (predicted output) being 1, and for example with a confidence score that satisfies the second criterion.

In another example, the activation state may be set to "deactivate the positioning sensor", such as to follow the activation indicator (predicted output) being 0, and for example with a confidence score that satisfies the second criterion.

In other words, the wireless device (such as the processor circuitry 303) may be configured to apply what the predicted output of the activation model is when the confidence score is acceptable (such as with regard to the second criterion). Formulated differently, as long as the confidence score satisfies a second criterion (such as is above a second threshold), the wireless device (such as the processor circuitry 303) may be configured to let the activation indicator control the activation state of the positioning sensor 304.

In one or more example wireless devices, when the confidence score does not satisfy a second criterion (such as is below a second threshold), the wireless device 300 (such as the processor circuitry 303) may be configured to always turn on the positioning sensor 304. When the control parameter does not satisfy the second criterion, the wireless device 300 may be configured to set the scenario as uncertain (such as undefined).

In one or more example wireless devices, the second criterion is based on one or more second thresholds. The second criterion may comprise one or more second thresholds, such as including a plurality of thresholds. A second threshold may for example comprise a threshold indicative of a confidence level that is acceptable for the activation indicator (such as in view of the confidence score). A second threshold may for example comprise a threshold associated with a user profile. A second threshold may comprise a pre-defined threshold and or a variable threshold (such as being adjusted in time).

In one or more example wireless devices, when the control parameter does not satisfy the second criterion, the processor circuitry 303 is configured to obtain, such as via the wireless interface 302, positioning data from the positioning sensor 304. The positioning data may comprise positioning labels (such as tags and/or flags), such as GNSS access labels. In other words, the wireless device 300, such as using the processor circuitry 303, is configured to read GNSS sensor data from the positioning sensor 304 when the control parameter does not satisfy the second criterion. When the control parameter does not satisfy the second criterion, the control parameter (such as the output of the activation model) may be considered as being uncertain. In one or more example wireless devices, when the control parameter is uncertain, the wireless device 300 may be configured to activate the positioning sensor 304. For example, in a new environment of the wireless device 300, the control parameter (such as output from the activation model) may be considered as uncertain and the positioning sensor 304 may be activated. The wireless device 300 may therefore be configured to verify or check whether the positioning sensor 304 has access to GNSS or not when the control parameter does not satisfy the second criterion. The wireless device 300 may thereby establish whether the control parameter (such as determined using the activation model) was correct or not in view of the positioning data from the positioning sensor 304.

In one or more example wireless devices, the processor circuitry is configured to determine an access parameter based on the positioning data. In one or more example wireless devices, the processor circuitry is configured to determine an access parameter when the control parameter does not satisfy the second criterion. The access parameter may be indicative of whether the positioning sensor 304 had access to GNSS (such as access to a satellite) or not. For example, when the positioning sensor 304 obtains a position, the access parameter may be determined to be 1 (such as indicative of the positioning sensor having access to GNSS, such as a position). When the positioning sensor 304 does not obtain a position, the access parameter may be determined to be 0 (such as indicative of the positioning sensor having access to GNSS, such as no position). In other words, GNSS sensor coordinates may be converted to a binary value with a label 1 representing that a GNSS fix can be obtained (such as 1 is indicative of access) and a label 0 otherwise (such as 0 is indicative of no access).

In one or more example wireless devices, the processor circuitry is configured to align (such as line-up, merge, and/or join), based on the access parameter (such as based on the converted GNSS data, for example based on the binary value), timing data of the positioning data with timing data of the channel quality parameter. In other words, the processor circuitry may be configured to match one or more timestamps of the positioning data (such as GSSR data) and one or more timestamps of the channel quality parameter (such as signal data).

In one or more example wireless devices, the processor circuitry is configured to align, based on the access parameter, the positioning data (such as positioning labels associated with the positioning data, for example GNSS access labels), with the channel quality parameter (such as positioning labels associated with the channel quality parameter).

In one or more example wireless devices, the processor circuitry 303 is configured to generate activation model data (such as training data) based on the aligning of the positioning data with the channel quality parameter.

In one or more example wireless devices, the processor circuitry 303 is configured to generate activation model data (such as training data) based on one or more of the channel quality parameter, the positioning data, the access parameter, the confidence score, the control parameter, and the access parameter. In other words, the processor circuitry 303 is configured to train (such as re-train) the activation model based on the aligning of the positioning data with the channel quality parameter. Aligning the positioning data with the channel quality parameter may comprise to compare the positioning data with the channel quality parameter (such as positioning data and the channel quality parameter having substantially the same timestamp). The wireless device 300 may be configured to update the activation model only when the control parameter does not satisfy the second criterion. An advantage of this, is that the wireless device 300 may save power by only updating the activation model when necessary.

In one or more example wireless devices, the processor circuitry 303 is configured to update the activation model based on the activation model data. The processor circuitry 303 may be configured to update the activation model and transmit it to the inference circuitry 303A.

In one or more example wireless devices, the positioning sensor is a Global Navigation Satellite System, GNSS, sensor, such as a global positioning system, GPS, sensor and/or a Galileo sensor.

In one or more example wireless devices, the wireless device 300 is configured to repeat the obtaining of a channel quality parameter indicative of a channel quality of a wireless communication channel, the determining of whether the channel quality parameter satisfies a first criterion, the determining, by using an activation model, of a control parameter based on the channel quality parameter, and the controlling of the positioning sensor based on the control parameter. By repeating these steps, the accuracy of activation model is improved (such as the uncertainty of the model is decreased). The wireless device may then improve the ability to activate and deactivate the positioning sensor 304. For example, when the wireless device 300 is in an environment (such as moves into areas) where the channel quality is low (such as reception of mobile data is low), the wireless device 300 may improve deactivation of the positioning sensor 304. For example, when the wireless device 300 is in an environment (such as moves into areas) where the channel quality is good (such as reception of mobile data is good), such as open areas with good visibility, the wireless device 300 may improve activation or reactivation of the positioning sensor 304. This may avoid that the positioning sensor 304 constantly searches for satellites to know whether the positioning sensor 304 has access or not, and thereby saving power.

Figure 3A:
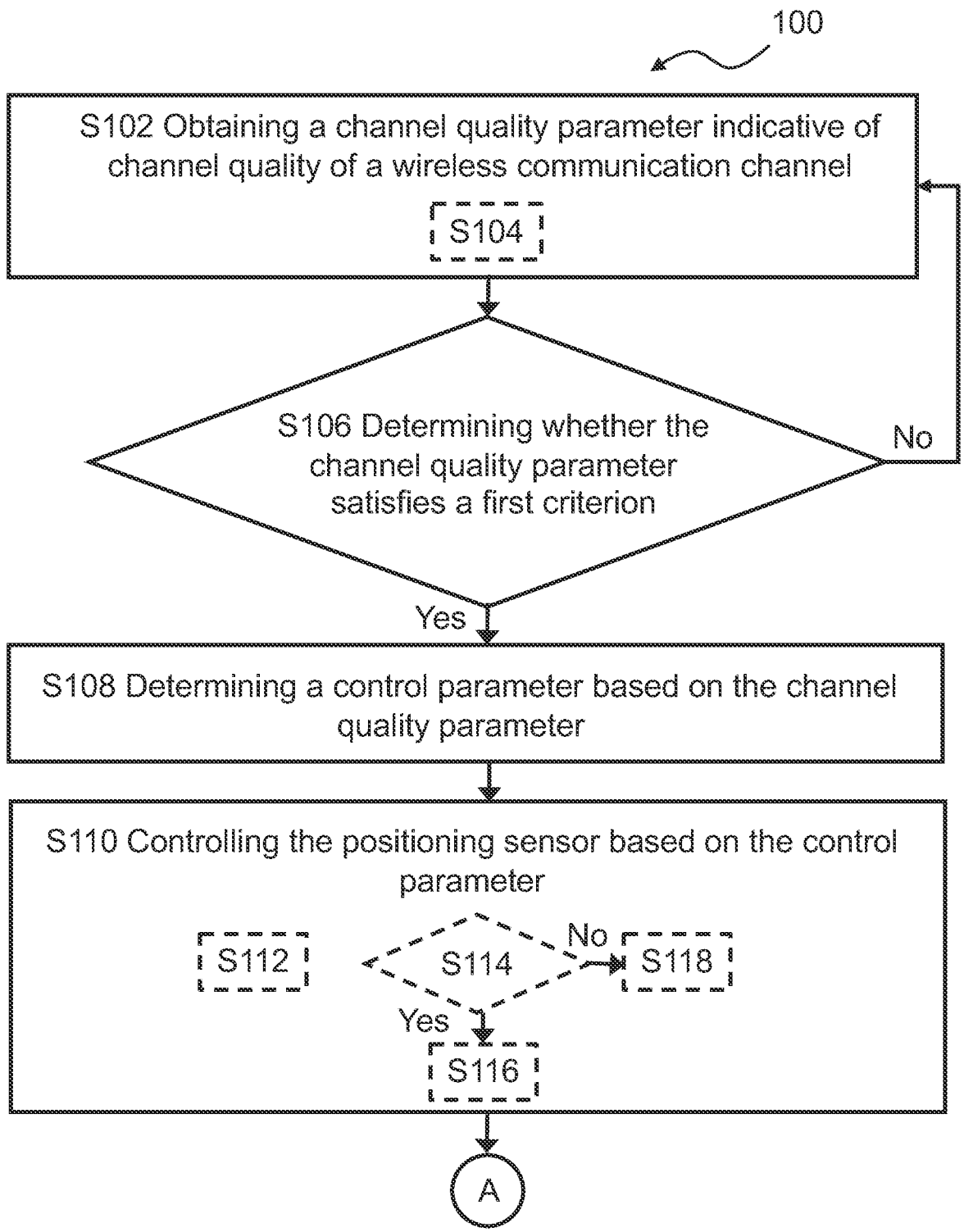
FIGS. 3A-3B are flow-charts illustrating an example method, performed by a wireless device, for controlling a positioning sensor of the wireless device according to this disclosure.
Figure 3B:
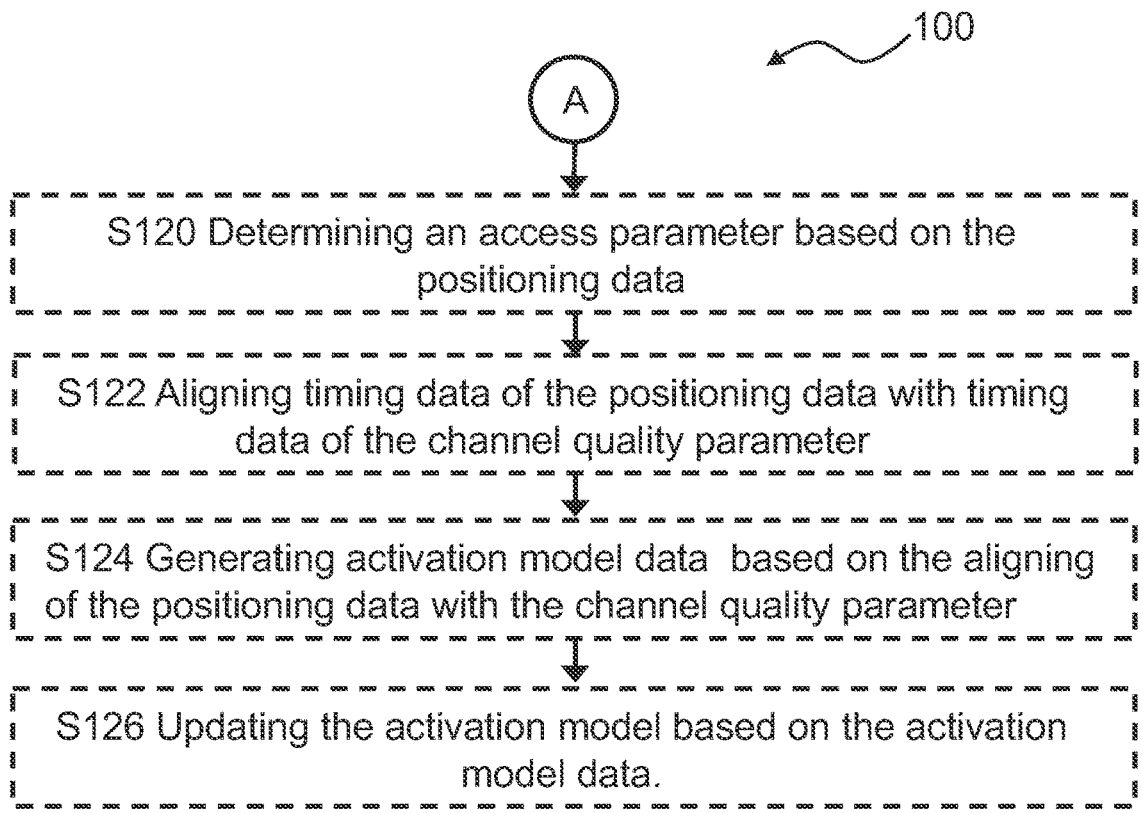

The wireless device 300 is optionally configured to perform any of the operations disclosed in FIGS. 3A-3B (such as any one or more of S104, S112, S114, S116, S118, S120, S122, S124, S126). The operations of the wireless device 300 may be embodied in the form of executable logic routines (for example, lines of code, software programs, etc.) that are stored on a non-transitory computer readable medium (for example, memory circuitry 301) and are executed by processor circuitry 303).

Furthermore, the operations of the wireless device 300 may be considered a method that the wireless device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 303. Memory circuitry 301 may exchange data with processor circuitry 303 over a data bus. Control lines and an address bus between memory circuitry 301 and processor circuitry 303 also may be present (not shown in FIG. 3). Memory circuitry 301 is considered a non-transitory computer readable medium.

Memory circuitry 301 may be configured to store information (such as information indicative of second set of paging resources) in a part of the memory.

FIGS. 3A-3B shows a flow diagram of an example method 100, performed by a wireless device according to the disclosure, for controlling a positioning sensor of the wireless device. The method 100 may be performed by a wireless device disclosed herein, such as wireless device 300 of FIGS. 1-2.

The method 100 comprises obtaining S102 a channel quality parameter indicative of channel quality of a wireless communication channel observed by the wireless device.

The method 100 comprises determining S106 whether the channel quality parameter satisfies a first criterion.

The method 100 comprises, when the channel quality parameter satisfies the first criterion, determining, S108, by using an activation model, a control parameter based on the channel quality parameter.

The method 100 comprises, when the channel quality parameter satisfies the first criterion, controlling S110 the positioning sensor based on the control parameter.

In one or more example methods, the wireless communication channel comprises a cellular communication channel of a cellular system.

In one or more example methods, the channel quality parameter comprises one or more of a signal strength indicator, a channel quality indicator, CQI, a timing advance value, an error rate parameter, and a difference in signal strength.

In one or more example methods, the first criterion comprises a first threshold.

In one or more example methods, the method 100 comprises obtaining S104 an updated channel quality parameter.

In one or more example methods, the control parameter comprises an activation indicator and/or a confidence score.

In one or more example methods, the controlling S110 of the positioning sensor comprises selecting S112 an activation state of the positioning sensor.

In one or more example methods, the activation model comprises model layers including an input layer, one or more intermediate layers, and an output layer for provision of the control parameter.

In one or more example methods, at least one of the one or more intermediate layers is indicative of a radio context.

In one or more example methods, the controlling S110 of the positioning sensor comprises determining S114 whether the control parameter satisfies a second criterion.

In one or more example methods, the second criterion is based on a user profile.

In one or more example methods, the controlling S110 of the positioning sensor comprises setting S116 the activation state of the positioning sensor according to the activation indicator when the control parameter satisfies the second criterion.

In one or more example methods, the second criterion is based on one or more second thresholds.

In one or more example methods, when the control parameter does not satisfy the second criterion, the method 100 comprises obtaining S118 positioning data from the positioning sensor.

In one or more example methods, the method 100 comprises determining S120 an access parameter based on the positioning data.

In one or more example methods, the method 100 comprises aligning S122, based on the access parameter, timing data of the positioning data with timing data of the channel quality parameter.

In one or more example methods, the method 100 comprises generating S124 activation model data based on the aligning of the positioning data with the channel quality parameter.

In one or more example methods, the method 100 comprises updating S126 the activation model based on the activation model data.

In one or more example methods, the positioning sensor is a Global Navigation Satellite System, GNSS, sensor.

The server device (such as server device 600 of FIG. 1) is optionally configured to perform any of the operations disclosed in FIGS. 3A-3B (such as any one or more of S104, S112, S114, S116, S118, S120, S122, S124, S126). The operations of the server device 600 may be embodied in the form of executable logic routines (for example, lines of code, software programs, etc.) that are stored on a non-transitory computer readable medium (for example, memory circuitry of the server device) and are executed by processor circuitry of the server device).

Examples of methods and wireless devices according to the disclosure are set out in the following items:

Item 1. A wireless device (300) comprising a positioning sensor (304), memory circuitry (301), a wireless interface (302), and processor circuitry (303), wherein the processor circuitry (303) is configured to:
  obtain a channel quality parameter indicative of a channel quality of a wireless communication channel;
  determine whether the channel quality parameter satisfies a first criterion;
  wherein the processor circuitry (303) is configured to, when the channel quality parameter satisfies the first criterion:
    determine, by using an activation model, a control parameter based on the channel quality parameter; and
    control the positioning sensor (304) based on the control parameter.

Item 2. The wireless device according to item 1, wherein the wireless communication channel comprises a cellular communication channel of a cellular system.

Item 3. The wireless device according to any of items 1-2, wherein the channel quality parameter comprises one or more of a signal strength indicator, a channel quality indicator, CQI, a timing advance value, an error rate parameter, and a difference in signal strength.

Item 4. The wireless device according to any of items 1-3, wherein the first criterion comprises a first threshold.

Item 5. The wireless device according to any of items 1-4, wherein the processor circuitry is configured to obtain an updated channel quality parameter.

Item 6. The wireless device according to any of items 1-5, wherein the control parameter comprises an activation indicator and/or a confidence score.

Item 7. The wireless device according to any of items 1-6, wherein the controlling of the positioning sensor comprises a selection of an activation state of the positioning sensor.

Item 8. The wireless device according to any of items 1-7, wherein the activation model comprises model layers including an input layer, one or more intermediate layers, and an output layer for provision of the control parameter.

Item 9. The wireless device according to item 8, wherein at least one of the one or more intermediate layers is indicative of a radio context.

Item 10. The wireless device according to any of items 1-9 wherein the controlling of the positioning sensor comprises to determine whether the control parameter satisfies a second criterion.

Item 11. The wireless device according to item 10, wherein the second criterion is based on a user profile.

Item 12. The wireless device according to items 6, 7, and 10, wherein the controlling of the positioning sensor comprises to set the activation state of the positioning sensor according to the activation indicator when the control parameter satisfies the second criterion.

Item 13. The wireless device according to any of items 10-12, wherein the second criterion is based on one or more second thresholds.

Item 14. The wireless device according to any of items 10-13 wherein when the control parameter does not satisfy the second criterion, the processor circuitry is configured to obtain positioning data from the positioning sensor.

Item 15. The wireless device according to item 14, wherein the processor circuitry is configured to determine an access parameter based on the positioning data.

Item 16. The wireless device according to item 15, wherein the processor circuitry is configured to align, based on the access parameter, timing data of the positioning data with timing data of the channel quality parameter.

Item 17. The wireless device according to item 16, wherein the processor circuitry is configured to generate activation model data based on the aligning of the positioning data with the channel quality parameter.

Item 18. The wireless device according to item 17, wherein the processor circuitry is configured to update the activation model based on the activation model data.

Item 19. The wireless device according to any of items 1-18, wherein the positioning sensor is a Global Navigation Satellite System, GNSS, sensor.

Item 20. A method (100), performed by a wireless device, for controlling a positioning sensor of the wireless device, the method comprising:
- obtaining (S102) a channel quality parameter indicative of channel quality of a wireless communication channel observed by the wireless device;
- determining (S106) whether the channel quality parameter satisfies a first criterion;
- when the channel quality parameter satisfies the first criterion:
  - determining (S108), by using an activation model, a control parameter based on the channel quality parameter; and
  - controlling (S110) the positioning sensor based on the control parameter.

Item 21. The method according to item 20, wherein the wireless communication channel comprises a cellular communication channel of a cellular system.

Item 22. The method according to items 20-21, wherein the channel quality parameter comprises one or more of a signal strength indicator, a channel quality indicator, CQI, a timing advance value, an error rate parameter, and a difference in signal strength.

Item 23. The method according to items 20-22, wherein the first criterion comprises a first threshold.

Item 24. The method according to items 20-23, wherein the method comprises obtaining (S104) an updated channel quality parameter.

Item 25. The method according to items 20-24, wherein the control parameter comprises an activation indicator and/or a confidence score.

Item 26. The method according to items 20-25, wherein the controlling (S110) of the positioning sensor comprises selecting (S112) an activation state of the positioning sensor.

Item 27. The method according to items 20-26, wherein the activation model comprises model layers including an input layer, one or more intermediate layers, and an output layer for provision of the control parameter.

Item 28. The method according to item 27, wherein at least one of the one or more intermediate layers is indicative of a radio context.

Item 29. The method according to items 20-28, wherein the controlling (S110) of the positioning sensor comprises determining (S114) whether the control parameter satisfies a second criterion.

Item 30. The method according to item 29, wherein the second criterion is based on a user profile.

Item 31. The method according to items 25, 26 and 29, wherein the controlling (S110) of the positioning sensor comprises setting (S116) the activation state of the positioning sensor according to the activation indicator when the control parameter satisfies the second criterion.

Item 32. The method according to items 29-31, wherein the second criterion is based on one or more second thresholds.

Item 33. The method according to items 29-32, wherein when the control parameter does not satisfy the second criterion, the method comprises obtaining (S118) positioning data from the positioning sensor.

Item 34. The method according to item 33, the method comprising determining (S120) an access parameter based on the positioning data.

Item 35. The method according to item 34, the method comprising aligning (S122), based on the access parameter, timing data of the positioning data with timing data of the channel quality parameter.

Item 36. The method according to item 35, the method comprising generating (S124) activation model data based on the aligning of the positioning data with the channel quality parameter.

Item 37. The method according to item 36, the method comprising updating (S126) the activation model based on the activation model data.

Item 38. The method according to item 20-37, wherein the positioning sensor is a Global Navigation Satellite System, GNSS, sensor.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-3B comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. A wireless device comprising a positioning sensor, memory circuitry, a wireless interface, and processor circuitry, wherein the processor circuitry is configured to:
   obtain a channel quality parameter indicative of a channel quality of a wireless communication channel between the wireless device and a radio access network node of a wireless communication system;
   determine whether the channel quality parameter satisfies a first criterion;
   wherein the processor circuitry is configured to, when the channel quality parameter satisfies the first criterion:
      determine, by using an activation model, a control parameter based on the channel quality parameter, the control parameter comprising an activation indicator for the positioning sensor, wherein the positioning sensor is a sensor for determining position of the wireless device from signals from a global navigation satellite system; and
      control the positioning sensor by selection of an activation state of the positioning sensor based on the control parameter;
   wherein the control of the positioning sensor comprises to determine whether the control parameter satisfies a second criterion;
   wherein when the control parameter does not satisfy the second criterion, the processor circuitry is configured to obtain positioning data from the positioning sensor;
   wherein the processor circuitry is configured to determine an access parameter based on the positioning data; and
   wherein the processor circuitry is configured to align, based on the access parameter, first timing data of the positioning data with second timing data of the channel quality parameter.

2. The wireless device according to claim 1, wherein the wireless communication channel comprises a cellular communication channel of a cellular system.

3. The wireless device according to claim 1, wherein the channel quality parameter comprises one or more of a signal strength indicator, a channel quality indicator, CQI, a timing advance value, an error rate parameter, and a difference in signal strength.

4. The wireless device according to claim 1, wherein the first criterion comprises a first threshold.

5. The wireless device according to claim 1, wherein the processor circuitry is configured to obtain an updated channel quality parameter.

6. The wireless device according to claim 1, wherein the control parameter further comprises a confidence score.

7. The wireless device according to claim 1, wherein the activation model comprises model layers including an input layer, one or more intermediate layers, and an output layer for provision of the control parameter.

8. The wireless device according to claim 7, wherein at least one of the one or more intermediate layers is indicative of a radio context.

9. The wireless device according to claim 1, wherein the second criterion is based on a user profile.

10. The wireless device according to claim 1, wherein the controlling of the positioning sensor comprises to set the activation state of the positioning sensor according to the activation indicator when the control parameter satisfies the second criterion.

11. The wireless device according to claim 1, wherein the second criterion is based on one or more second thresholds.

12. The wireless device according to claim 1, wherein the processor circuitry is configured to generate activation model data based on the aligning of the positioning data with the channel quality parameter.

13. The wireless device according to claim 12, wherein the processor circuitry is configured to update the activation model based on the activation model data.

14. The wireless device according to claim 1, wherein the positioning sensor is a Global Navigation Satellite System, GNSS, sensor.

15. A method, performed by a wireless device, for controlling a positioning sensor of the wireless device, the method comprising:
   obtaining a channel quality parameter indicative of channel quality of a wireless communication channel between the wireless device and a radio access network node of a wireless communication system observed by the wireless device;
   determining whether the channel quality parameter satisfies a first criterion;
   when the channel quality parameter satisfies the first criterion:
      determining, by using an activation model, a control parameter based on the channel quality parameter, the control parameter comprising an activation indicator for the positioning sensor, wherein the positioning sensor is a sensor for determining position of the wireless device from signals from a global navigation satellite system; and
      controlling the positioning sensor by selection of an activation state of the positioning sensor based on the control parameter;
   wherein the controlling of the positioning sensor comprises determining whether the control parameter satisfies a second criterion;
   wherein when the control parameter does not satisfy the second criterion, the processor circuitry obtaining positioning data from the positioning sensor;
   the processor circuitry determining an access parameter based on the positioning data; and
   the processor circuitry aligning, based on the access parameter, first timing data of the positioning data with second timing data of the channel quality parameter.

* * * * *